July 2, 1963
A. CIMINAGHI
3,096,054
FUEL FEED OR SUPPLY SYSTEM FROM SEPARATE TANKS WITH MEANS
FOR ITS QUICK DISCHARGE IN CASE OF BREAKDOWN FOR
AIRCRAFT INSTALLATIONS AND THE LIKE
Filed Nov. 24, 1961
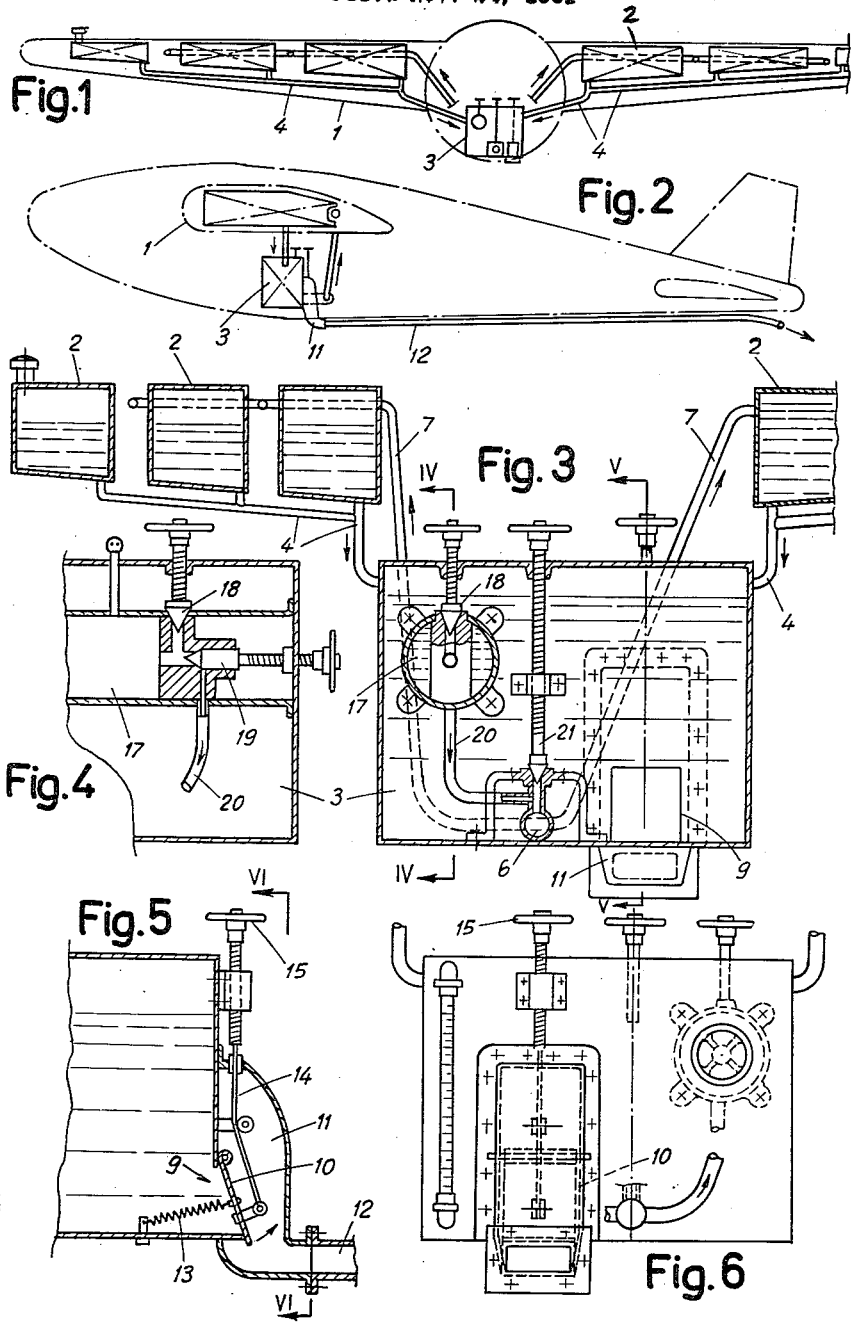
INVENTOR:
ATTILIO CIMINAGHI
by
Squire + Olcott
Att'ys.

3,096,054
FUEL FEED OR SUPPLY SYSTEM FROM SEPARATE TANKS WITH MEANS FOR ITS QUICK DISCHARGE IN CASE OF BREAKDOWN FOR AIRCRAFT INSTALLATIONS AND THE LIKE
Attilio Ciminaghi, Piazza Pietro Leopoldo 9, Florence, Italy
Filed Nov. 24, 1961, Ser. No. 154,759
Claims priority, application Italy Dec. 1, 1960
3 Claims. (Cl. 244—135)

The invention relates to a fuel supply system for aircraft engines. The invention avoids hazards due to the presence of the fuel which may cause a fire in the event of engine failure and also allows dumping of the fuel in case of an emergency landing.

The invention comprises an interconnected series of separate wing tanks supplying fuel to an intermediate tank which is normally completely filled and which is positioned to receive fuel by gravity flow from the wing tanks. The fuel is pumped from the intermediate tank to the different engines in such a manner as to avoid any direct communication among the engines and the wing tanks.

The intermediate tank is provided with a quick acting discharge valve for dumping the fuel therefrom and thus from the wing tanks, as in the event of forced landings or other emergencies.

In order to provide a small supply of fuel for use after the main fuel supply has been dumped, a suitably vented emergency tank is fixedly enclosed within the intermediate tank. The emergency tank is filled by gravity from the normally full intermediate tank by means of a passage communicating with the upper portion of the intermediate tank. A manually operable shut-off valve is arranged to open or close the filling passage of the emergency tank at will. A discharge passage leads from the emergency tank to the engine fuel supply lines and the discharge passage is provided with a separate manually operable shut-off valve. The shut-off valve in the discharge passage is not opened until the main fuel supply in the wing tanks and the intermediate tank has been dumped. Enclosure of the emergency tank within the then empty intermediate tank reduces the fire hazard incidental to an emergency or crash landing because of the limited amount of fuel in the emergency tank and also because of the shielding effect of the intermediate tank.

The invention will be better understood from the following description with reference to the accompanying drawing.

In the drawing:

FIGS. 1 and 2 illustrate diagrammatic front and side views respectively, of an aircraft;

FIG. 3 illustrates a system of fuel tanks installed on the aircraft of FIGS. 1 and 2;

FIG. 4 illustrates a fragmentary section taken along the line IV—IV of FIG. 3;

FIGS. 5 and 6 illustrate, respectively, a fragmentary section taken along the line V—V of FIG. 3, and an end elevational view along the line VI—VI of FIG. 5.

Referring to the drawing, the interconnected main wing tanks 2, which are for drawing clarity in FIG. 3, drawn much smaller than they are really, are installed in the wings 1. At one of the end wing tanks on one side there will be an appropriate filling opening or inlet; at the end wing tank of the other side there will be a suitable vent (not shown). Below the wing tanks 2, there is provided an auxiliary intermediate tank 3 to which the tanks 2 are connected through pipes 4. Consequently the intermediate tank 3 is constantly filled with fuel by gravity flow during the consumption of the fuel contained in the main wing tanks 2; in ordinary flight, the tank 3 will always be completely filled with fuel.

From the discharge passage 6 arranged at the bottom of the auxiliary intermediate tank 3, conduits 7 supply fuel to the engines, suitable pumping means (not shown) being provided.

Adjacent the bottom of the intermediate tank 3, there is provided a large dumping opening 9 normally sealed closed by a hinged door 10 (FIG. 5), which communicates with a chamber 11 from which a large dumping conduit 12 extends to the rear end of the fuselage below and behind the tail structure. A helical tension spring 13 yieldingly holds the door 10 tightly closed and for its opening, there is provided, for instance, a tie rod 14 actuable by a handwheel 15.

Consequently this arrangement avoids direct communication between the main tanks 2 and the engines, while the conduit 7 between the engines and the fuel source lead from an intermediate tank 3 which is relatively small and which is constantly full of fuel to the exclusion of air, whereby the possibility of fire is minimized. The dumping door 9 permits the quick discharge of the main fuel supply in event of a breakdown and in case of a forced landing or the like.

In order to allow final engine power, for instance in case of a forced landing, there is provided a vented emergency tank 17 which is fixedly positioned within the interior of the intermediate tank 3 and is provided with an inlet shut-off valve 18, through which its filling with fuel is effected, the fuel being supplied from the upper portion of the tank 3 by gravity flow.

A manually operable shut-off valve 19 (see FIG. 4) allows communication through a conduit or pipe 20 between the emergency tank 17 and the supply manifold 6, when this is required. A further manually operable shut-off valve 21 then closes the communication between the auxiliary tank 3, which thus may be emptied through the dumping opening 9, and the manifold 6 which may then be supplied from the tank 17 through the conduit 20 to effect, by means of the engines, the last manoeuvres or operations in case of a breakdown and emergency.

While I have shown and described what I believe to be the best embodiments of my invention, it will be apparent to those skilled in the art that various changes and modifications may be made therein without departing from the spirit and scope of the invention as defined in the appended claims.

What I claim is:

1. A fuel supply system of the class described comprising: a series of interconnected vented wing tanks; a closed intermediate tank positioned below said wing tanks; first conduit means interconnecting said wing tanks and said intermediate tank for gravity flow of liquid fuel from said wing tanks to said intermediate tank whereby said intermediate tank is normally completely filled with fuel excluding air therefrom; quick-acting dumping valve means positioned at the bottom portion of said intermediate tank; second conduit means communicating with said intermediate tank for supplying fuel to at least one aircraft engine; a closed individually vented auxiliary tank fixedly positioned within the interior of said intermediate tank; first manually operable valve means for causing said second conduit means to communicate with said auxiliary tank to the exclusion of said intermediate tank; and second manually operable valve means for causing said auxiliary tank to communicate with the interior of said filled intermediate tank to receive fuel therefrom by gravity flow.

2. A system according to claim 1, further comprising a winged aircraft having a fuselage and tail structure, said wing tanks being positioned in the wings of said aircraft and said intermediate tank in said fuselage; and a dumping conduit extending from said quick-acting valve means to a location below and behind said tail structure.

3. A system according to claim 2, wherein said intermediate tank has a dumping opening formed therein adjacent to the bottom thereof, said quick-acting valve means comprising a spring-pressed hinged door normally closing said dumping opening, and in which one end of said dumping conduit is enlarged to define a chamber which surrounds said dumping opening and said hinged door, said quick-acting valve means further comprising manually operable means extending into said chamber and connected to said hinged door, said manually operable means being actuable to swing said door away from said dumping opening into said chamber for dumping fuel from said intermediate tank.

References Cited in the file of this patent

UNITED STATES PATENTS

| | | |
|---|---|---|
| 695,173 | Rohrbacher | Mar. 11, 1902 |
| 1,396,940 | Nelson | Nov. 15, 1921 |
| 2,319,844 | Black | May 25, 1943 |
| 2,588,778 | Tibeau | Mar. 11, 1952 |
| 2,880,749 | Brown | Apr. 7, 1959 |

FOREIGN PATENTS

| | | |
|---|---|---|
| 575,045 | Canada | Apr. 28, 1959 |